United States Patent [19]

Gehris

[11] Patent Number: 4,733,839
[45] Date of Patent: Mar. 29, 1988

[54] NONORTHOGONAL GIMBAL

[75] Inventor: James D. Gehris, Rancho Palos Verdes, Calif.

[73] Assignee: McDonnell Douglas Corporation, Long Beach, Calif.

[21] Appl. No.: 934,467

[22] Filed: Nov. 24, 1986

[51] Int. Cl.⁴ .......................................... F16M 11/12
[52] U.S. Cl. ..................................... 248/180; 74/5.2; 343/765
[58] Field of Search ............... 248/180, 182, 179, 183, 248/178; 74/5.2; 403/58, 74, 53; 343/765

[56] References Cited

U.S. PATENT DOCUMENTS

| | | | |
|---|---|---|---|
| 1,092,867 | 4/1914 | Sellew | 248/180 |
| 1,182,881 | 5/1916 | Frye | 248/180 |
| 2,516,068 | 7/1950 | Nash | 248/183 |
| 2,700,106 | 1/1955 | Taylor | 343/765 X |
| 2,726,834 | 12/1955 | Hoge | 248/180 |
| 2,730,813 | 1/1956 | Sinks | 74/5.2 X |
| 2,924,824 | 2/1960 | Lanctot et al. | 343/765 |
| 2,934,960 | 5/1960 | Chombard | 76/5.2 |
| 2,950,079 | 8/1960 | Horsfall | 248/179 |
| 2,989,278 | 6/1961 | Hyman | 248/106 |
| 3,047,863 | 8/1962 | Bolie | 343/117 |
| 3,084,342 | 4/1963 | Fuller et al. | 343/761 |
| 3,115,326 | 12/1963 | Barringer | 248/358 |
| 3,765,631 | 10/1973 | Herbst et al. | 248/204 |
| 3,861,763 | 1/1975 | Perkins | 308/2 R |
| 4,002,078 | 1/1977 | Thomas | 74/5 R |
| 4,082,005 | 4/1978 | Erdley | 73/505 |

Primary Examiner—J. Franklin Foss
Assistant Examiner—David L. Talbott
Attorney, Agent, or Firm—George W. Finch; John P. Scholl; James M. Skorich

[57] ABSTRACT

Gimbal comprised of four concentric cylindrical shells rotatively attached to each other by three pairs of bearings or flexures. The innermost shell is rigidly attached to a suspended instrument. The outermost shell is attached to a vehicle. Each of the three pairs of bearings are colinear and define three axes of rotation which intersect at a point. None of the three axes are coincidental with a line of sight emanating from the instrument, and two of them are nonorthogonal. The gimbal provides the instrument with freedom of rotation about any axis relative to the vehicle, including about the instrument's line of sight, without the line of sight being vignetted by a bearing or any other gimbal structure. The respective angles between the three axes of rotation are set to minimize the exposure of the gimbal to gimbal lock, as well as to minimize the onset of secondary disturbances that occur when gimbal lock is approached.

5 Claims, 1 Drawing Figure

NONORTHOGONAL GIMBAL

BACKGROUND OF THE INVENTION

1. Field of the Invention

This invention pertains to gimbals and, more particularly, to a gimbal having structural axes of rotation which intersect nonorthogonally.

2. Description of the Prior Art

The use of a gimbal to maintain a steady line of sight for an instrument mounted on a moving vehicle is well known. Due to the large distance typically separating a target located in the instrument's line of sight and the instrument, relative translation between the target and the instrument is of little consequence. However, the line of sight is quite sensitive to relative angular motion between the instrument and the target, and the gimbal has been used to mount the instrument on the moving vehicle in an effort to solve this problem. The gimbals of the prior art have used three orthogonal axes of rotation, one each coincident with the pitch, roll, and yaw axes, respectively, of the vehicle. This has given rise to a problem, however, because the structure necessary to support one of the axes typically blocks the line of sight of the instrument, commonly termed "vignetting."

Several designs have been used in attempting to overcome the vignetting problem. One employs a cantilevered Y-shaped yoke which holds the instrument in the fork of the yoke. The stem of the yoke is colinear with the instrument's line of sight, and is cantilevered from a pair of bearings to allow rotation of the stem. The apparatus thus allows an unobstructed line of sight for the instrument while providing the instrument with a rotational degree of freedom about the line of sight.

There are two typical configurations which incorporate this design. The first holds the stem between a pair of annular bearings spaced some distance apart from each other. This configuration minimizes frictional torque because the bearing diameters are small. However, bending stiffness is compromised because the shaft diameter is necessarily small in order to fit within the bearings. The reduced bending stiffness allows an increase in the amplitude of the bending of the shaft and yoke at a relatively low frequency, resulting in an undesirable angular motion of the line of sight.

The other configuration which uses a Y-shaped yoke passes the stem of the yoke through a pair of annular bearings located adjacent to each other. This alternative employs bearings having a large diameter and thus allows a large diameter shaft to be used, thereby significantly reducing the low frequency bending experienced in the first configuration. However, a higher frictional torque is generated, primarily from the increased radius of the bearings. The increased frictional torque proportionally decreases the servo's ability to stabilize the line of sight of the apparatus mounted on the gimbal. This results in a larger angular error than would otherwise be the case for a gimbal with a lower frictional torque.

Another attempt at solving this problem uses two spoked wheels to rotatively attach one end of the suspended instrument to the gimbal. One spoked wheel is fixedly situated in the end of the instrument from which the line of sight emanates, while the second wheel is spaced apart therefrom and is fixedly attached along its circumference to the gimbal (typically by being attached to the inner diameter of a cylinder which is in turn attached to the gimbal). Each wheel has an annular bearing at its center and a rotatable shaft passes through both of them. The other end of the instrument is rotatively attached to the gimbal by a second shaft which is attached to the instrument and extends therefrom to a bearing mounted on the gimbal structure. The instrument is thus supported between the two shafts and rotatively attached to the remainder of the gimbal structure. The two shafts lie upon the line of sight of the instrument, and thereby provide the instrument with the freedom to rotate about its line of sight.

The frictional torque for such a configuration can be made acceptably low and the structural stiffness can be made high enough to satisfy the criteria for most applications. The spoked wheels avoid total vignetting of the line of sight. However, the partial obstruction of the line of sight is nonetheless unacceptable for many applications, for example, a tracker with a defocused image or an infrared optical system. It should be noted that translucent glass discs may be substituted for the spoked wheels to further reduce the partial vignetting occasioned by the spokes of the spaced wheels. However, this variation of the spaced wheel concept may introduce undesirable optical effects.

Another approach is to use a spherical hydrostatic gas bearing having a large cylindrical passageway through the center of the suspended sphere to contain the instrument and leave its line of sight unobstructed. The sphere is supported on a layer of gas flowing from orifices in two opposing concave cups which are very closely spaced from the sphere. This configuration provides the lowest frictional torque and the highest structural stiffness of any design of the prior art.

There are, however, several drawbacks attendant to the use of a spherical hydrostatic gas bearing. The apparatus is very expensive because the sphere and cups must be fabricated to an extremely high degree of accuracy. A reservoir and valve or pump are necessary to supply a continuous flow of gas at the required pressure. As the cups continuously emit gas into the immediate environment, this concept cannot be used on many extraterrestrial missions because the gas would interfere with experiments. In addition, the gas bearing is very sensitive to the presence of foreign matter, for example, dust or oil, in between a cup and the sphere. More particularly, insertion of foreign matter in the space separating a cup and the sphere couples the sphere to the cup, which is in turn attached to the vehicle, and thereby allows vibration to be transmitted from the vehicle to the sphere.

The instrument has also been held in the center of a large ring bearing in an attempt to overcome the problems of vignetting. In this configuration, the inner diameter of the bearing holds the instrument while the outer diameter is attached to the remaining structure of the gimbal. The instrument is situated in the bearing so that its line of sight either coincides with or is parallel to the bearing's axis of symmetry. The problem inherent in this design is that the bearing typically has a relatively large radius and, concomitantly, a large frictional torque which, as previously explained, increases the angular error between the line of sight and the target.

SUMMARY OF THE INVENTION

Briefly, the present invention is a gimbal for passively suspending an instrument having a line of sight which intersects a target. The gimbal is attached to a moving vehicle, and prevents the line of sight from being thrown off of the target by angular motion of the vehicle relative to the target. The gimbal is comprised of four concentric cylindrical shells which are rotatively attached to each other by three pairs of flexures or bearings. The innermost shell is rigidly attached to the instrument, or could comprise the instrument housing. The outermost shell is attached to the vehicle.

Each of the three pairs of bearings are colinear and define three axes of rotation which intersect at a point. None of the three axes are coincidental with the line of sight, the three axes are not in a single plane, and two of them are nonorthogonal. The instrument has freedom of rotation about any axis relative to the vehicle, including about the instrument's line of sight, without the line of sight being vignetted by a bearing or any other gimbal structure. The respective angles between the three axes of rotation are configured to minimize the exposure of the gimbal to gimbal lock, as well as to minimize the onset of secondary disturbances that occur when gimbal lock is approached.

The gimbal of the present invention provides an unobstructed line of sight without using a cantilevered yoke, and thereby avoids the attendant problems of higher frictional torque and decreased structural stiffness which contribute to errors between the line of sight and the target. The invention also avoids the expense, peripheral equipment, and maintenance problems inherent in the use of a spherical hydrostatic gas bearing to suspend the instrument.

The gimbal of the present invention provides for the rotation of the instrument about an axis coincidental with the instrument's line of sight, but without the unacceptable frictional torque which attends the mounting of the instrument within a large ring bearing. The present invention also avoids the partial vignetting which will occur when spoked wheels or glass discs are used to suspend the instrument and obtain a rotational degree of freedom about the instrument's line of sight.

DETAILED DESCRIPTION OF THE DRAWING

Figure 1:
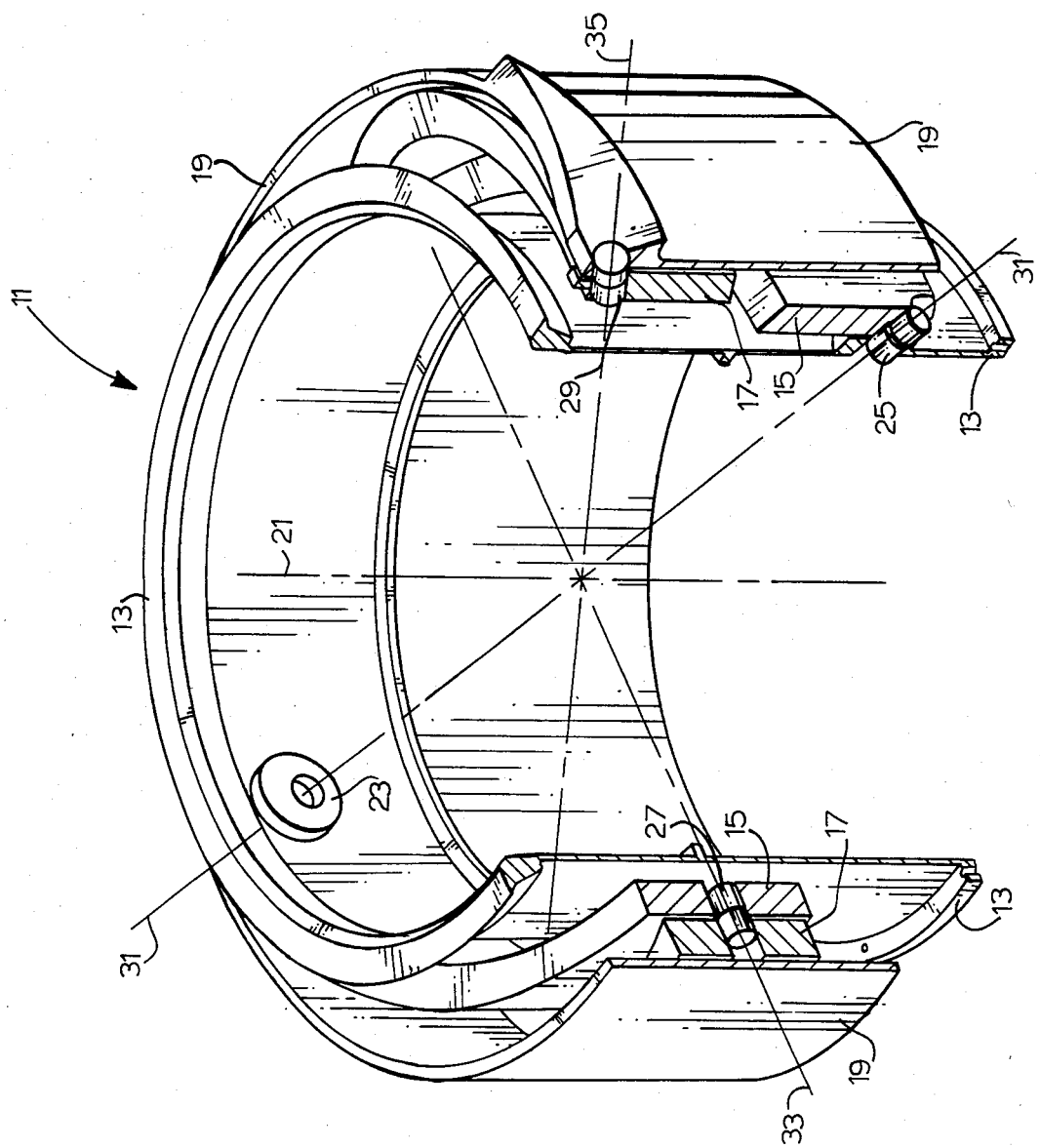
FIG. 1 is a partially sectioned perspective view of the preferred embodiment of the present invention.

Turning to the drawing, gimbal 11, a preferred embodiment of the present invention, is shown partially sectioned and in perspective. Gimbal 11 is comprised of four concentric cylindrical shells: inner shell 13, shell 15, shell 17, and outer shell 19. Each shell is attached to an adjacent shell and has freedom to rotate with respect to the adjacent shell by means of a pair of colinear bearings or flexures.

Gimbal 11 is attached at outer shell 19 to a vehicle (not shown) which moves and rotates, such as a flight vehicle. An instrument (not shown) having line of sight 21 is held by inner shell 13, although inner shell 13 may also comprise the housing of the instrument. Line of sight 21 coincides with the axis of symmetry of inner shell 13. Other embodiments of the present invention may suspend an instrument having a line of sight which is at an angle to and/or does not intersect the axis of symmetry of inner shell 13.

Line of sight 21 intersects a target, and it is intended that line of sight 21 remain fixed on the target, unaffected by the rotation of the vehicle. None of the structure of gimbal 11 vignettes line of sight 21. The physical nature of the beam that travels between the instrument and the target along line of sight 21 depends upon the type of the instrument suspended by gimbal 11. For example, when the instrument is a camera, a beam of light will travel along line of sight 21 and will pass through the aperture of the camera. Given the appropriate instrument, electromagnetic waves or a laser beam could also travel along line of sight 21.

Inner shell 13 is attached to shell 15 by means of colinear bearings 23 and 25. Shell 15 is attached to shell 17 by means of bearing 27 and another bearing which is colinear with bearing 27 but is not shown. Shell 17 is attached to outer shell 19 by means of bearing 29 and another bearing which is colinear with bearing 29 but is not shown.

Colinear bearings 23 and 25 provide structural axis of rotation 31. Bearing 27 and its colinear partner provide structural axis of rotation 33. Bearing 29 and its colinear partner provide structural axis of rotation 35. Axis 33 is orthogonal with axes of rotation 31 and 35, and therefore orthogonally intersects the plane containing axes 31 and 35. As subsequently discussed in detail, axes of rotation 31 and 35 are not orthogonal with each other. Axis of rotation 33 also orthogonally intersects line of sight 21.

For a gimbal having three axes of rotation, gimbal lock (also known as singularity) occurs when the three axes of rotation are made coplanar, or when two of the axes are parallel. In the former situation, the gimbal cannot provide rotation about the axis normal to the plane formed by the three coplanar axes. When the latter configuration occurs, the gimbal loses a degree of freedom and cannot provide complete freedom of motion with the remaining two degrees of freedom. Secondary disturbances will occur when the axes of rotation approach a gimbal lock configuration.

In order to eliminate vignetting while at the same time minimizing the present invention's exposure to gimbal lock and the onset of secondary disturbances attendant to its approach, axes of rotation 31 and 35 are oriented at approximately 50 degrees with respect to each other. Furthermore, the angle between axis 31 and line of sight 21 is approximately 65°, and the angle between axis 35 and line of sight 21 is also approximately 65°.

The structural configuration of gimbal 11 provides the suspended instrument with angular freedom of motion about any axis, including an axis colinear with line of sight 21, without vignetting line of sight 21. Errors in line of sight 21, for example, due to relative translational motion between the vehicle and the target, or inertial forces acting on the instrument, are corrected by a servo apparatus. Although the servo apparatus could change the orientation of the suspended instrument by acting through gimbal 11, it is preferable to make attitude corrections by directly driving the instrument or shell 13 because this enables the servo apparatus to respond at a higher frequency (or higher servo band width, to use a term of the art) than would otherwise be the case.

Changes and modifications in the specifically described embodiment can be carried out without departing from the scope of the invention which is intended to be limited only by the scope of the appended claims.

What is claimed is:
1. A gimbal comprising:
a first shell;
a second shell encircling and being rotatively attached to the first shell by a first pair of pivots so that the first shell can rotate relative to the second shell about a first axis of rotation;

a third shell encircling and being rotatively attached to the second shell by a second pair of pivots so that the second shell can rotate relative to the third shell about a second axis of rotation;

a fourth shell encircling and being rotatively attached to the third shell by a third pair of pivots so that the third shell can rotate relative to the fourth shell about a third axis of rotation; and two of the three axes of rotation being nonorthogonal, and the remaining axis of rotation being orthogonal to the plane containing the two nonorthogonal axes of rotation; whereby the first shell is free to rotate relative to the fourth shell.

2. The gimbal recited in claim 1 wherein:

the two nonorthogonal axes of rotation intersect at an angle of approximately 50°.

3. The gimbal recited in claim 2 wherein:

the first, second and third axes of rotation intersect at a point;

the first shell has a longitudinal axis which intersects the point of intersection of the first, second and third axes of rotation; and the two nonorthogonal axes of rotation each intersect the longitudinal axis of the first shell at an acute angle of approximately 65°.

4. The gimbal recited in claim 3 further comprising:

a line of sight emanating from the first shell and lying parallel to the longitudinal axis of the first shell, and not being obstructed by any structure of the gimbal.

5. The gimbal recited in claim 4 wherein:

the four shells are concentric cylinders having open ends.

* * * * *